United States Patent [19]

Frayer

[11] Patent Number: 4,851,467

[45] Date of Patent: Jul. 25, 1989

[54] MOLDING COMPOSITIONS COMPRISING WHOLLY AROMATIC POLYMERS WHICH CONTAIN CARBON BLACK

[75] Inventor: Paul D. Frayer, Martinez, Ga.

[73] Assignee: Amoco Corporation, Chicago, Ill.

[21] Appl. No.: 179,048

[22] Filed: Apr. 8, 1988

Related U.S. Application Data

[63] Continuation-in-part of Ser. No. 937,944, Dec. 4, 1986.

[51] Int. Cl.⁴ ............................................... C08K 3/04
[52] U.S. Cl. .................................... 524/495; 524/496; 524/847
[58] Field of Search ............... 524/495, 496, 847, 604, 524/605; 523/215; 106/307

[56] References Cited

U.S. PATENT DOCUMENTS

| | | | |
|---|---|---|---|
| 3,476,703 | 11/1969 | Wadsworth et al. | 523/215 |
| 3,637,595 | 1/1972 | Cottis et al. | 264/210 F |
| 3,975,487 | 8/1976 | Cottis et al. | 264/210 F |
| 4,265,789 | 5/1981 | Christopherson et al. | 428/244 |
| 4,472,295 | 9/1984 | Fox et al. | 524/496 |
| 4,522,974 | 6/1985 | Calundann et al. | 524/604 |
| 4,563,508 | 1/1986 | Cottis et al. | 525/444 |
| 4,626,557 | 12/1986 | Duska et al. | 523/100 |

OTHER PUBLICATIONS

Raven Blacks-Technical Data & Pricing, date unknown.
Cabot Carbon Blacks for Ink, Paint, Plastics, Paper; Technical Report S-36, copyright Oct. 1984.
The Role of Carbon Black in Plastics Dispersion; No. CS0045, date unknown.
A Primer on Carbon Blacks for Use in Plastics Applications; No. CS16072, Oct. 1982.
Carbon Black Selection for Plastics; Technical Report S-34, date unknown.

*Primary Examiner*—Morton Foelak
*Attorney, Agent, or Firm*—Jones, Askew & Lunsford

[57] ABSTRACT

This invention relates to molding compositions comprising wholly aromatic polyesters which contain carbon black, wherein the molding compositions exhibit a uniform color and can be molded into strong thermally stable articles.

10 Claims, 2 Drawing Sheets

MOLDING COMPOSITIONS COMPRISING WHOLLY AROMATIC POLYMERS WHICH CONTAIN CARBON BLACK

This application is a continuation-in-part of U.S. patent application Ser. No. 06/937,944; filed Dec. 4, 1986.

The present invention relates to molding compositions comprising wholly aromatic polyesters which contain carbon black. More particularly, the present invention relates to molding compositions comprising wholly aromatic polyesters which contain up to about 5%, by weight, of a carbon black which has a minimal content of inherent volatiles that are decomposable at elevated temperatures.

Wholly aromatic polyesters can be produced by various processes, including suspension polymerization and bulk polymerization. However, because these polyesters have high melting points as compared with aliphatic or mixed aliphatic/aromatic polyesters, such as polyethylene terephthalate, much higher temperatures are required to maintain the aromatic polyesters in their molten state. Consequently, because of these high temperatures, addition of carbon black to the molten aromatic polyester often results in unsuitable products for molding.

In coloring polymers, a common practice is to include carbon black in the molten polymer before molding. Another method of adding carbon black to polymers involves the preparation of a slurry of the carbon black in a portion of the diol being used to prepare the polymers, and then injecting the diol slurry into the polymerization mixture at some appropriate point. Other methods for incorporating carbon black into a polymer include the injection of aqueous slurries of carbon black into the polymerization system or tumbling the polymer with dry carbon black before melting and extruding the polymer. The tumbling method is a preferred method and applicable to the present invention.

When high volatile content carbon blacks are used at the operating temperatures of wholly aromatic polyesters, undesirable foaming can occur, as well as an undesirable reduction of the melt viscosity and the creation of undesirable internal surfaces which are more susceptible to degradation at the high temperatures. Further, difficulty has been experienced in maintaining lot-to-lot consistency in molding characteristics of the wholly aromatic polyester after addition of carbon black because of the deleterious effect on viscosity and the tendency to foam. Obviously, these variations are undesirable in commercial operations and can result in inefficiencies of operation and unacceptable differences (for example, strength and density) in molded articles. Much effort has, therefore, been expended on the development of molding compositions of wholly aromatic polyesters containing carbon black so that the resulting molded articles are of high quality.

Prior art methods for incorporating certain carbon blacks in polyesters have proven reasonably satisfactory. However, prior art methods have not been found satisfactory for incorporating finely-divided carbon blacks into wholly aromatic polyesters. These methods, when used for finely-divided carbon blacks, produce a dispersion of agglomerated particles of excessive size which tend to give a reddish cast to the pigmented article. Agglomeration can also result in optical inefficiency for the pigment, surface defects in the pigmented article, and reduced strength in the pigmented article.

The wholly aromatic polyesters, useful in this invention, have melting temperatures of between approximately 200° C. and 450° C. Because of these high temperatures, difficulty has been encountered in adding carbon black to these wholly aromatic polyesters. Therefore, a need exists for molding compositions comprising wholly aromatic polyesters which contain carbon black, wherein these compositions exhibit a uniform black color and, when in the molten state, will not undesirably foam or exhibit an undesirable reduction in melt viscosity.

Accordingly, an object of the present invention is to provide a black-colored wholly aromatic polyester for use in molding compositions.

A further object of the present invention is to provide a black-colored wholly aromatic polyester that does not have a reduced melt viscosity.

Another object of the present invention is to provide a black-colored wholly aromatic polyester that does not foam when carbon black is added to the molten polyester.

Yet another object of the present invention is to provide a process for adding carbon black to wholly aromatic polyesters without reducing the thermal stability of the polyester.

Another object of the present invention is to provide a process for adding carbon black to wholly aromatic polyesters without increasing the compressive flow values of the polyester.

These and other objects, features and advantages of the present invention will become apparent from the following detailed description.

In accordance with the present invention, a uniform black color can be imparted to articles prepared from wholly aromatic polyesters. Undesirable foaming that normally occurs when carbon black is added to wholly aromatic polyesters can be substantially reduced by adding carbon black with the following physical characteristics: The carbon black particle size is preferably between about 25 and 75 microns in diameter, more preferably between about 30 and 50 microns. The surface area of the carbon black is preferably between about 40 and 100 square meters per gram, more preferably between about 45 and 70 square meters per gram. The inherent volatiles in the carbon black should be less than about 1.2% and preferably between about 0% and 0.9% by weight. The preferred weight per cent of carbon black to wholly aromatic polyester is between about 0.5 and 5.0 percent, more preferably between about 1.5 and 2.0 percent.

Compositions containing wholly aromatic polyesters using carbon black with the above-mentioned physical characteristics exhibit a uniform color, minimal reduction in melt viscosity, and a reduced creation of internal surfaces and can be molded into strong thermally stable articles.

Figure 1:
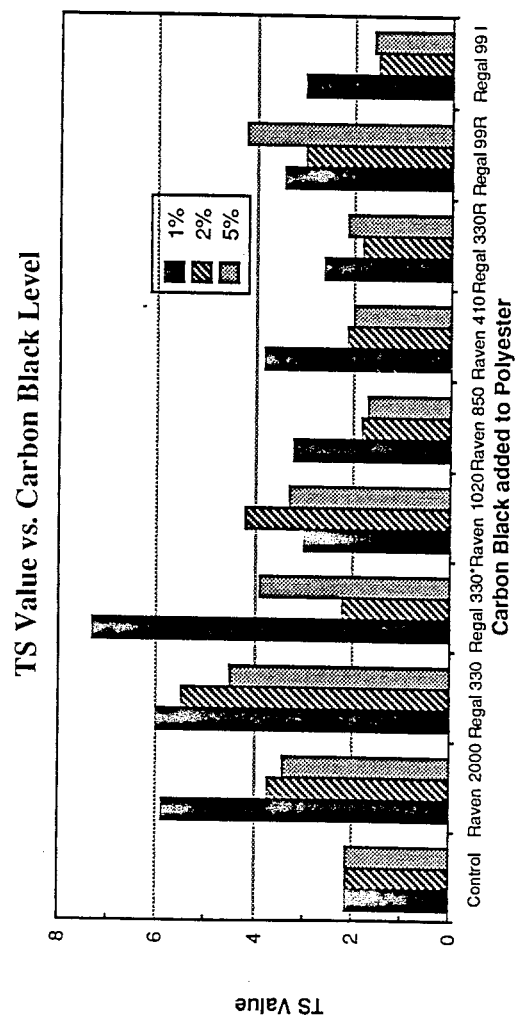
FIG. 1 is a graph comparing the thermal stability vs. carbon black level of a wholly aromatic polyester to which several different concentrations of carbon blacks have been added.

In this application, the term Regal is a trademark of Cabot Corporation (Boston, MA) for carbon black, and the term Raven is a trademark of Columbian Chemicals Company (Tulsa, OK) for carbon black.

The present invention comprises a process for coloring wholly aromatic polyesters with carbon black. Carbon black performance depends on both physical and chemical properties which are interdependent. For example, particle diameter and three dimensional clustering of particles affect the overall surface area of the carbon black. The surface chemistry combined with the surface area determines the chemical activity of the carbon black. At the same time, the inherent volatiles content relates to the surface area and the surface chemistry, both of which determine the blackness imparted to the wholly aromatic polyester.

Surface areas between about 40 and 100 square meters per gram are classified as regular carbon blacks. Below 40 square meters per gram, the blackness level is low; above 100 square meters per gram the chemical activity and moisture pickup are too high for use in the wholly aromatic polyesters of this invention.

Foaming of the wholly aromatic polyester extrudate implies the presence of some form of volatiles within the molten polyesters. When the carbon black is added to the wholly aromatic polyesters at a high temperature, the volatiles are driven off and cause foaming in the molten polyester. The majority of the inherent volatiles of a well-dried carbon black are chemically adsorbed carbon-oxygen complexes that are not expected to be driven off at the temperatures used at processing the wholly aromatic polyesters. However, some of these volatiles may be given off as the result of chemical changes at the carbon black surfaces. Furthermore, the high surface area carbon blacks with high inherent volatiles are quite hygroscopic (several percent moisture pickup) and the carbon/oxygen complexes can be chemically reactive.

Drying is more critical with the more active carbon blacks. Not only can moisture be picked up from the air while handling after drying, but also moisture may be picked up even while being dried in an air oven or heated hopper dryer when the intake air contains moisture. Thus, batch to batch variations are more likely to occur with higher surface area carbon black which not only can pick up more moisture than less active carbon blacks, but also can bind the moisture more tenaciously.

Strongly hydrogen bonded water is known to require 500° F. or higher to be desorbed from carbon black. Thus, the standard drying temperature of 350° F. prior to compounding is expected to be less efficient with the more active blacks which contain very acidic functional groups on the carbon surfaces. Such active carbon-oxygen-hydrogen groups may act as a catalyst or react directly with the polyester at high processing temperatures and cause a reduction in molecular weight of the polyester. The corresponding reduction in melt viscosity can lead to foaming. Resin variations (e.g. residual monomers, polymerization by-products, moisture) are other sources for volatiles which may cause foaming.

The wholly aromatic polyesters useful in the present invention comprise combinations of repeating units of one or more of the following formulae:

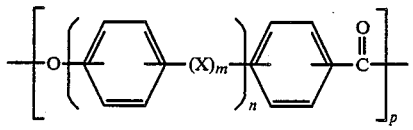
I

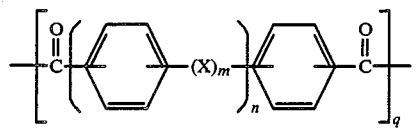
II

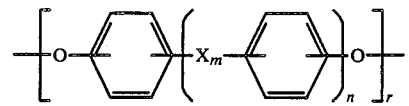
III

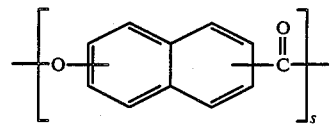
IV

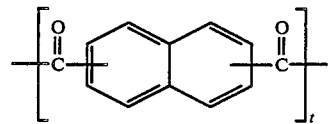
V

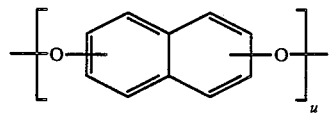
VI where X is —O—, —S—, —CO—, or —SO2—, and m and n are independently zero or one, and the total of the integers $p+q+r+s+t+u$ is from approximately 3 to about 800.

In the most general combination, all of the units of the above formula can be present in a single polyester. A simple embodiment would be homopolymers of units I or IV.

The preferred location of the functional groups is preferably in the para (1,4) positions. With respect to the naphthalene moiety, the preferred locations of the functional groups are 1,4; 1,5 and 2,6.

The symbols p, q, r, s, t, and u are integers and indicate the number of moieties present in the polyester. The total $(p+q+r+s+t+u)$ can vary from 3 to 800 and, when present, the ratio of q:r, q:u, t:r, t:u, q+t:r, q+t:r+u, and t:r+u, of the moieties can vary from about 10:11 to about 11:10, with the most preferably ratio being 10:10.

Exemplary of monomers from which the moieties of formula I may be obtained are: p-hydroxybenzoic acid, phenyl-p-hydroxybenzoate, p-acetoxybenzoic acid and isobutyl-p-acetoxybenzoate. Those monomers from which the moiety of formula II may be obtained include terephthalic acid, isophthalic acid, diphenyl terephthalate, diethyl isophthalate, methylethyl terephthalate and the isobutyl half ester of terephthalic acid. Among the monomers from which the moiety of formula III results are: p,p'-biphenol; p,p'-oxybiphenol; 4'-dihydroxybenzophenone; resorcinol and hydroquinone.

Examples of monomers represented by formula IV are: 4-hydroxy-1-naphthoic acid; 5 acetoxy-1-naphthoic acid; and phenyl 5-hydroxy-1-naphthoate. Monomers representing formula V include: 1,4-naphthalene dicarboxylic acid; 1,5-naphthalene dicarboxylic acid and 2,6-naphthalene dicarboxylic acid. The diphenyl esters or dicarbonyl chlorides of these acids can also be used.

Examples of the monomers representative of the formulas VI are 1,4-dihydroxynaphthalene; 2,6-diacetoxynaphthalene and 1,5-dihydroxynaphthalene.

A preferred class of polyesters have recurring units of formula VII, VIII, and IX:

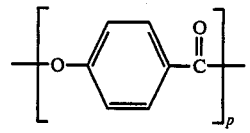
VII

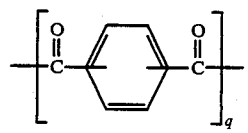
VIII

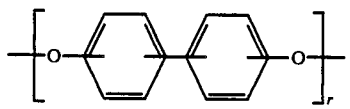
IX wherein the total of the integers p+q+r is about 3 to 800, the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

The especially preferred polyesters comprise the precursor formulas VII, VIII and IX wherein the molar ratios are 2:1:1, respectively. A method for the synthesis of these polyesters is described in Cottis et al. U.S. Pat. No. 3,637,595.

The bulk condensation of wholly aromatic polyesters is described in Example 1 of Finestone U.S. Serial No. 06/556,485, filed Nov. 30, 1983.

The wholly aromatic polyesters useful in the present invention can also be chemically modified by various means such as by inclusion in the polyester of monofunctional reactants such as benzoic acid or a higher functional reactant such as trimesic acid or cyanuric chloride. The benzene rings in these polyesters are preferably unsubstituted but can be substituted with noninterferring substituents, examples of which include halogens (such as chlorine or bromine), lower alkoxy groups (such as methoxy), and lower alkyl groups (such as methyl and ethyl).

The invention is further illustrated by the following examples in which all parts and percentages are by weight unless otherwise indicated. These examples are illustrative of certain embodiments designed to teach those of ordinary skill in the art how to practice the invention and to represent the best mode contemplated for carrying out the invention.

In Table I, seven commercially available carbon blacks were characterized as to particle size in nanometers, surface area in square meters per gram, and percent volatiles. Raven 2000 carbon black is commonly used in plastics where high blackness is desired. However, this carbon black also has a high surface area (190 square meters per gram) and a high inherent volatiles content (2.6%) compared with other carbon blacks which are more suitable for use in the present invention.

The term "high inherent volatiles" is defined as materials decomposable at elevated temperatures characterized by a weight loss at elevated temperatures.

TABLE I

| Carbon Black | Carbon Black Characteristics | | |
|---|---|---|---|
| | Particle Size in Nanometers | Surface Area Sq m/g | % Volatiles |
| Raven 2000 | 18 | 190 | 2.6 |
| Raven 1020 | 27 | 95 | 1.5 |
| Raven 850 | 31 | 70 | 1.2 |
| Raven 410 | 70 | 24 | 0.7 |
| Regal 330 | 25 | 89 | 0.8 |
| Regal 99 | 36 | 46 | 0.6 |
| Sterling R | 75 | 25 | 0.5 |

The most important carbon black quality for use in the present invention is that the carbon black have a lower inherent volatile content for the same surface area.

Example 1

Several different commercially available carbon blacks were added to a molten wholly aromatic polyester at a concentration of 1%, 2%, and 5%, weight:weight. The compressive flow (CF) values and thermal stability (TS) values of the wholly aromatic polyesters were then measured - see FIGS. 1 and 2, respectively.

The TS values are measured by the following procedure

1. The sample is ground to pass through a 2 mm screen.
2. The ground sample and an equal amount of ground material from a control batch are heated in an air oven at 400° C. for 16 hours.
3. The weight loss of the test sample and the control sample are measured, and the TS value of the test sample is calculated by means of the following formula:

$$TS \text{ value} = \frac{\log\left(1 - \frac{\text{wt. loss of test sample}}{\text{wt. of polyester in test sample}}\right)}{\log\left(1 - \frac{\text{wt. loss of control sample}}{\text{wt. of polyester in control sample}}\right)}$$

If the TS value is larger than one, the sample is less thermally stable than the control. If the TS value is smaller than one, the sample is more thermally stable than the control.

The Compressive Flow values are determined by the method described in column 3 of U.S. Pat. No. 4,563,508.

Figure 2:
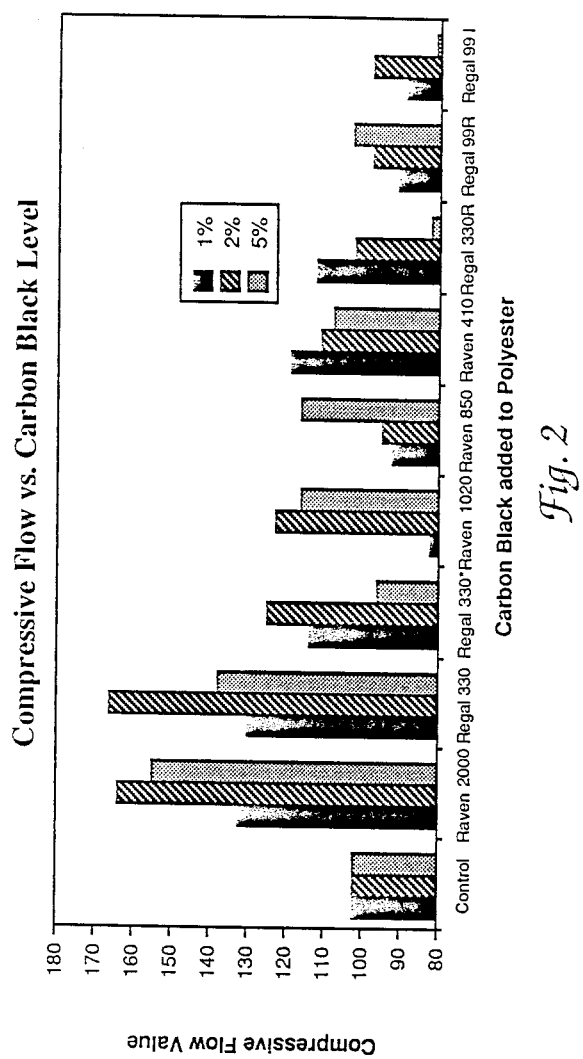
FIG. 2 is a graph comparing compressive flow vs. carbon black level of a wholly aromatic polyester to which several different concentrations of carbon blacks have been added.

The wholly aromatic polyester used in FIGS. 1 and 2 has the following composition:
Milled glass fiber . . . 39.6%
Xydar SRT-300 resin* . . . 55.4%
Flow modifier . . . 4.0%
*(as described in U.S. Pat. No. 4,563,508)

The term Xydar is a registered trademark of Dart Industries Inc. for wholly aromatic polyesters.

The carbon blacks used in this experiment were Raven 2000, Raven 1020, Raven 850, Raven 410, Regal 330, Regal 330*, Regal 330R, Regal 99R, and Regal 99I. The carbon blacks were added to the wholly aromatic polyester, and the TS values were measured for the polyester with and without carbon black. As shown in FIG. 1, the control wholly aromatic polyester without carbon black has a TS value of approximately 2.1. The carbon blacks that were added to the wholly aromatic polyesters are grouped with the carbon black having the greatest inherent volatiles, i.e., Raven 2000, down to the carbon blacks having the lowest inherent volatiles, i.e. Regal 99I. The carbon blacks with the lowest inherent volatiles, in general, have the lowest TS values. An unexpected finding was that carbon blacks at a concentration of 2% by weight generally had lower TS values than the corresponding carbon black at a 1% level or a 5% level.

Example 2

The next experiment measured the compressive flow values of wholly aromatic polyesters containing various carbon blacks. The same carbon blacks that were used in Example 1 were added to the wholly aromatic polyester described in Example 1 at concentrations of 1%, 2% and 5% respectively. The results of this experiment are summarized in FIG. 2.

Relative to the control without any carbon black, the compressive flow values increase for the higher surface area carbon blacks or higher inherent volatiles carbon blacks. However, it was observed that most compressive flow samples have physical voids. Thus, the compressive flow values of the wholly aromatic polyester containing carbon black do not necessarily reflect the viscosity of the resin alone, but rather the apparent viscosity of a polyester that has foamed. It is not possible to factor out the relative contributions to increased flow caused by the voids (physical effect) and molecular weight reduction (chemical effect), assuming an increase in thermal stability relates to a decrease in the molecular weight. Regal 99I not only gave the best results but also did not exhibit voids at either 1% or 2% levels in the samples that were measured for compressive flow values.

Again, the observation was made that the carbon black added at a 2% concentration demonstrated generally better compressive flow values than carbon black added at a 1% concentration. This was true, not only for Regal 99I, but also for most of the other carbon blacks as well.

Example 3

The effect of various carbon black compounds on the tensile strength of the wholly aromatic polyester from Example 1 was next investigated. The tensile strength (in pounds per square inch) is determined by the ASTM D638 method. The carbon blacks that were investigated were as follows: Raven 2000, Regal 330, and Regal 99I. The results of this experiment are shown in Table 2.

TABLE 2

| Tensile Strength of Polyesters with Carbon Black | | | | |
|---|---|---|---|---|
| Carbon Black Type and Drying time and Temp. | Tensile Strengths for each polyester % carbon black | | | |
| | 1% | 1.5% | 2.0% | 2.5% |
| Raven 2000 | | | | |
| 350° F./12 hrs | 11540 | 12000 | 10800 | 11400 |
| 500° F./4 hrs | 11220 | 11560 | 11080 | 11340 |
| Regal 330 | | | | |
| 350° F./12 hrs | 11480 | 11580 | 11300 | 12140 |
| 500° F./4 hrs | 12020 | 11440 | 11820 | 11900 |
| Regal 99I | | | | |
| 350° F./12 hrs | 15300 | 15480 | 13430 | 13430 |
| 500° F./4 hrs | 10980 | 13800 | 11700 | 11440 |
| Raven 2000 | | | | |
| no drying | 12620 | | | |
| no drying | 11075 | | | |

Table 2 shows not only that the optimum level of carbon black is between 1.5% and 2%, but also that the effect of the amount persists even in the case where the carbon black may have been chemically changed.

Example 4

The effect of the addition of various carbon blacks to the wholly aromatic polyester from Example 1 was investigated in relation to the second fusion melting point peak temperature. These results are summarized in Table 3.

TABLE 3

| Second Melting Peak Ranking Plus TS & CF Data | | | |
|---|---|---|---|
| Carbon Black Compound | 2nd Tm | TS | CF |
| Control, No Carbon Black | 408.8 | 2.1 | 103 |
| 2% Regal 99I | 411.3 | 1.5 | 99 |
| 1% Regal 330 | 409.8 | 7.5 | 115 |
| 5% Regal 99I | 408.5 | 1.6 | 82 |
| 1% Regal 99I | 408.4 | 2.9 | 90 |
| 1% Regal 330 | 405.3 | 6.0 | 130 |
| 5% Regal 330 | 398.7 | 4.6 | 139 |
| 1% Raven 2000 | 398.0 | 5.9 | 131 |
| 2% Regal 330 | 405.7 | 2.3 | 125 |
| 2% Regal 330 | 394.6 | 5.5 | 167 |

The melting point peak temperature is determined on a differential scanning colorimeter (DSC), such as the Model 1090 DSC from DuPont, under a flow of nitrogen, at a heating rate of 20° C./minute up to 450° C. and a cooling rate of 10° C./minute.

The second fusion melting point peak temperature is determined on the DSC but on the second heating-/cooling cycle.

Table 3 ranks the carbon black compound samples from the earlier examples in terms of second fusion melting peak temperature. A good correlation was observed between TS values and the second fusion melting peak temperature Within experimental error, 1% and 5% Regal 99I have no effect on the peak melting point, whereas 2% Regal 99I apparently gives a slightly higher melting point compound and lower TS value which corresponds to a better thermal stability. The more active carbon blacks given significantly lower melting points and less thermal stability

Example 5

To check for readily measurable specific gravity differences, water volume displacement was used at a weight of 5 tensile bars to estimate the densities by the ratio of the weight of the bars to the volume displaced (in grams per cc). At 1.5% carbon black, a density difference within experimental error could not be detected, but at 2.5%, the Regal 99I compound molded density (1.77 grams per cc) was significantly greater than the Regal 330 compound molded density (1.70 grams per cc). This indicates appreciably less foaming in the former case.

Example 6

Table 4 shows the first and second differential scanning calorimetry (DSC) temperatures of crystallization. The data in Table 4 for the first and second DSC temperatures of crystallization onset basically agree with the melting point data, i.e. Regal 99I generally exhibits the least change relative to the control that is the wholly aromatic polyester without any carbon black present.

TABLE 4
Differential Scanning Calorimetry (DSC) Temperatures of Crystallization (Tx)

| Carbon Black Compound | 1st Tx | 2nd Tx |
| --- | --- | --- |
| Control, No Carbon Black | 359.2 | 356.2 |
| 2% Regal 99I | 357.8 | 353.7 |
| 1% Regal 330 | 356.9 | 351.1 |
| 5% Regal 99I | 357.7 | 354.5 |
| 1% Regal 99I | 357.6 | 353.0 |
| 2% Regal 330 | 358.2 | 355.5 |
| 1% Regal 330 | 356.1 | 351.0 |
| 5% Regal 330 | 354.3 | 351.4 |
| 1% Raven 2000 | 356.9 | 351.5 |
| 2% Regal 330 | 354.9 | 348.4 |

Example 7

The effect of the carbon blacks on thermal stability was further studied by determining the temperature required to cause a fixed percent weight loss. The wholly aromatic polyester used in this experiment was the same as that used in Example 1. These results are shown in Table 5. Column 1 shows the desired weight loss. The next 4 columns in Table 5 show the temperature required to obtain the weight loss in Column 1 for the control (no carbon black) and wholly aromatic polyesters with 1% Regal 330, 1% Regal 99I and 2% Regal 99I.

TABLE 5

| % Wt. Loss | 1% Regal 330 | Control | 2% Regal 99I | 5% Regal 99I |
| --- | --- | --- | --- | --- |
| 0.5 | 426° C. | 442° C. | 448° C. | 447° C. |
| 1.0 | 452 | 470 | 474 | 480 |
| 2.0 | 475 | 493 | 498 | 504 |
| 5.0 | 502 | 518 | 524 | 528 |
| 10.0 | 519 | 534 | 539 | 540 |
| 20.0 | 540 | 556 | 557 | 558 |

In Table 5, the temperatures at which the given percent weight losses occur are determined on a Perkin-Elmer TGS-2 Thermal Gravimetric Analyzer (TGA) in a nitrogen atmosphere at a heating rate of 10° C./minute.

For example, for a 2% weight loss, the 1% Regal 330 compound required only 475° C. versus 493° C. for the control. In contrast, the Regal 99I compound exhibited improved thermal stability and at the 2% carbon black concentration, required an 11° C. higher temperature to cause the same 2% weight loss.

This invention produces black-colored wholly aromatic polyester compositions which can be molded, by conventional methods, into strong, thermally stable articles having a uniform color.

The foregoing description relates only to preferred embodiments of the present invention, and numerous modifications or alterations may be made without departing from the spirit and scope of the invention as set forth in the appended claims.

I claim:

1. A polyester molding composition comprising at least about 35%, by weight, of a wholly aromatic polyester and about 0.5% to 5%, by weight, of a carbon black having a particle size between about 25 and 75 microns in diameter and containing a minimal amount of inherent volatiles such that during molding at elevated temperatures, the composition does not foam or exhibit an undesirable reduction in melt viscosity, wherein the carbon black has a total surface area of between approximately 40 and 100 square meters per gram and contains inherent volatiles of less than 1.2%, by weight.

2. The composition of claim 1 wherein the carbon black contains inherent volatiles of between approximately 0% and 0.9%, by weight.

3. The composition of claim 1 wherein the aromatic polyester is an oxybenzoyl copolyester.

4. The composition of claim 3 wherein the wholly aromatic polyester comprises recurrent moieties selected from the following formulae:

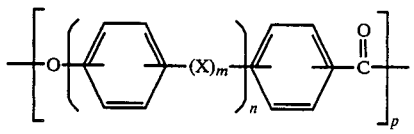
I

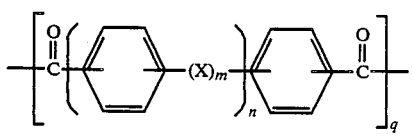
II

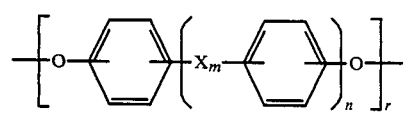
III

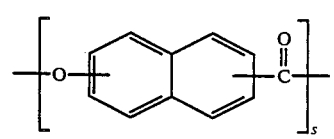
IV

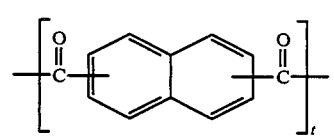
V

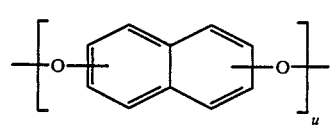
VI where X is —O—, —S—, —CO—, or —SO2; and m and n are independently zero or one, and the total of the integers p+q+r+s+t+u is from approximately 3 to about 800.

5. The composition of claim 4 wherein each of the ratios q:r, q:u, t:r, t:u, q+t:r, q+t:r+u, and t:r+u, of the moieties present, is about 10:11 to about 11:10.

6. The composition of claim 5 wherein each of the ratios is about 10:10.

7. The composition of claim 4 wherein n is zero.

8. The composition of claim 4 wherein the wholly aromatic polyester comprises recurrent moieties selected from the following formulae:

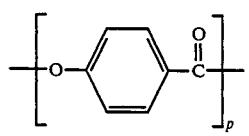
VII

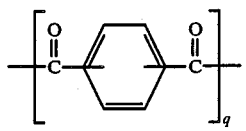
VIII

IX wherein the total of the integers p+q+r is about 3 to 800, the carbonyl groups of the moiety of formula VII or VIII are linked to the oxy groups of the moiety of formula VII or IX; and the oxy groups of the moiety of formula VII or IX are linked to the carbonyl groups of the moiety of formula VII or VIII.

9. The composition of claim 8 wherein the wholly aromatic polyester comprises recurrent units of moieties VII, VIII and IX, wherein the molar ratios are 2:1:1 respectively.

10. A molded article comprising at least about 35%, by weight, of a wholly aromatic polyester and about 0.5% to 5%, by weight, of a carbon black having a particle size between about 25 and 75 microns in diameter and containing a minimal amount of inherent volatiles such that, during molding at elevated temperatures, the composition does not foam or exhibit an undesirable reduction in melt viscosity, wherein the carbon black has a total surface area of between approximately 40 and 100 square meters per gram and contains inherent volatiles of less than 1.2%, by weight.

* * * * *

UNITED STATES PATENT AND TRADEMARK OFFICE
CERTIFICATE OF CORRECTION

PATENT NO. : 4,851,467

DATED : July 25, 1989

INVENTOR(S) : Paul David Frayer

It is certified that error appears in the above-identified patent and that said Letters Patent is hereby corrected as shown below:

| Column | Line | | |
|--------|------|---|---|
| 9 | 67 | "black has" should read | --black (a) has-- |
| 10 | 1 | "and contains" should read | --and (b) contains-- |
| 12 | 14-15 | "black has" should read | --black (a) has-- |
| 12 | 16 | "and contains" should read | --and (b) contains-- |

Signed and Sealed this

Seventeenth Day of July, 1990

Attest:

HARRY F. MANBECK, JR.

Attesting Officer

Commissioner of Patents and Trademarks